(12) United States Patent
Segre (10) Patent No.: US 9,049,212 B2
(45) Date of Patent: Jun. 2, 2015

(54) METHOD, SYSTEM, AND COMPUTER PROGRAM PRODUCT FOR PREFETCHING SYNC DATA AND FOR EDGE CACHING SYNC DATA ON A CELLULAR DEVICE

(75) Inventor: Marc Segre, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2083 days.

(21) Appl. No.: 10/954,832

(22) Filed: Sep. 30, 2004

(65) Prior Publication Data

US 2006/0069742 A1    Mar. 30, 2006

(51) Int. Cl.
*G06F 15/16* (2006.01)
*H04B 1/38* (2006.01)
*H04L 29/08* (2006.01)

(52) U.S. Cl.
CPC ........ *H04L 67/1095* (2013.01); *H04L 67/2847* (2013.01); *H04L 67/04* (2013.01); *H04L 67/28* (2013.01)

(58) Field of Classification Search
USPC ......... 709/202, 203, 217, 218, 219, 232, 246, 709/248, 249
See application file for complete search history.

(56) References Cited

U.S. PATENT DOCUMENTS

| | | | |
|---|---|---|---|
| 6,029,175 A * | 2/2000 | Chow et al. ................ | 707/104.1 |
| 6,201,976 B1 * | 3/2001 | Rasanen ....................... | 455/557 |
| 6,452,910 B1 | 9/2002 | Vij et al. | |
| 6,549,917 B1 | 4/2003 | Pollard et al. | |
| 6,636,873 B1 * | 10/2003 | Merchant et al. ............. | 707/201 |
| 6,775,291 B1 * | 8/2004 | Ryu et al. ...................... | 370/401 |
| 6,947,440 B2 * | 9/2005 | Chatterjee et al. ............ | 370/429 |
| 7,003,115 B1 * | 2/2006 | Suzuki et al. .................. | 380/270 |
| 7,136,368 B2 * | 11/2006 | Inoue ............................. | 370/338 |
| 7,269,629 B2 * | 9/2007 | Zmudzinski et al. ......... | 709/207 |
| 7,421,411 B2 * | 9/2008 | Kontio et al. ................... | 705/52 |
| 2002/0078180 A1 * | 6/2002 | Miyazawa ..................... | 709/219 |
| 2002/0085511 A1 * | 7/2002 | Koponen et al. .............. | 370/315 |
| 2002/0087549 A1 * | 7/2002 | Mostafa ......................... | 707/10 |
| 2002/0126643 A1 | 9/2002 | Forstadius et al. | |
| 2003/0126056 A1 * | 7/2003 | Hausman et al. ............... | 705/36 |
| 2006/0041687 A1 * | 2/2006 | Caspi et al. ................... | 709/248 |
| 2006/0146765 A1 * | 7/2006 | Van De Sluis et al. ....... | 370/338 |
| 2006/0156347 A1 * | 7/2006 | Zhang et al. .................... | 725/62 |

FOREIGN PATENT DOCUMENTS

WO    WO 00/68811    11/2000

* cited by examiner

*Primary Examiner* — Madhu Woolcock
(74) *Attorney, Agent, or Firm* — Douglas A. Lashmit; Hoffman Warnick LLC (57) ABSTRACT

The present invention provides a method, system, and computer program product for prefetching sync data and for edge caching on a cellular device (e.g., a cell phone). The method for prefetching sync data comprises: providing unprocessed sync data at a first location; downloading the unprocessed sync data from the first location to a second location over a first network; processing the unprocessed sync data at the second location to provide preprocessed sync data; storing the preprocessed sync data in a cache; receiving a sync request from a mobile device; and immediately providing at least a portion of the preprocessed sync data stored in the cache to the mobile device.

24 Claims, 7 Drawing Sheets

METHOD, SYSTEM, AND COMPUTER PROGRAM PRODUCT FOR PREFETCHING SYNC DATA AND FOR EDGE CACHING SYNC DATA ON A CELLULAR DEVICE

BACKGROUND OF THE INVENTION

1. Field of the Invention

The present invention generally relates to the transfer of data. More particularly, the present invention provides a method, system, and computer program product for prefetching sync data and for edge caching sync data on a cellular device (e.g., a cell phone).

2. Related Art

True enterprise applications are gaining support on mobile devices. Two of the most well known enterprise applications include electronic mail (email) and Personal Information Management (PIM). For several years, applications that sync email and PIM data have used a client installed locally by a user that draws from a copy of the user's data with mobile device connectivity through a cradle sync. As mobile devices and their connectivity continue to improve, however, the syncing of data is moving to a more robust and enterprise centric model. In such an enterprise centric model, server data is often synced using secure transport over a wide area network (WAN), a wireless local area network (WLAN), or a personal area network (PAN). In addition, requirements are moving from simple email and PIM static replicas to the processing of data at the mobile device (e.g., deleting, filling, sending, accepting meetings, etc.), and the deployment of multiple applications other than just email and PIM.

While efforts have been made to optimize sync performance, it still remains a time consuming process, and many techniques have been introduced to reduce the time required by sync processes. Most mobile device users desire a push model where a sync server sends updates as available to the mobile device to keep the mobile device updated without user intervention. However, a push model is difficult to implement because mobile devices often lose connectivity, roam between networks, can be difficult for the sync server to locate, go to sleep to conserve power, or otherwise become unavailable to receive pushed sync data. A compromise often employed is to perform a timed pull on a regular interval. However, if the mobile device has been offline or out of network range, a sync will be needed once connectivity is re-established.

When a mobile device connects to a sync server, the time of the mobile device's last sync is used to search for user data that has changed since the last sync was performed. Email messages, calendar records, and/or other user data that has changed since the last sync are then retrieved, fields are translated as necessary, and any other required formatting performed. Thereafter, the new sync data is sent to the mobile device. This process typically takes many server request/server response transactions with large gaps in between as the sync server communicates with an associated backend server and prepares the data for the mobile device. The time required to perform a sync, therefore, is often quite long, especially when the sync occurs over a network with a slow data transfer rate such as a cellular network. This is even a greater problem when a plurality of mobile devices require the same sync data, thereby necessitating the redundant transfer of the same sync data to each of the plurality of mobile devices.

Today, there is an ever increasing proliferation of new mobile devices available to users. This presents several challenges related to mobile devices having different data transfer speeds and users having multiple mobile devices. This also leads to an increased dependency and resulting demand for robustness and performance of the applications used by mobile devices.

An interesting by-product of this increased dependency is that users have become used to having a cell phone, laptop connectivity in any location (e.g., via a WAN, WLAN, etc.), and a handheld/personal digital assistant (PDA) device with network access and data availability that can be used in the areas where laptop connectivity is not available. Unfortunately, this results in multiple cellular phone accounts/numbers each with a separate monthly service charge. One way to avoid such multiple services charges is to use a Bluetooth enabled cell phone to provide both data and connectivity for a user's laptop and any number of handheld/PDA devices. However, the slow data transfer speed (e.g., 1.5×dial-up) between the cell phone and the cellular network greatly limits the use of a cell phone in this manner.

The ideal connectivity model employs a continuous connection and a push synchronization model. Unfortunately, the push sync model can be difficult to implement and can have some undesirable side effects. For example, as stated above, a push sync model is difficult to implement because mobile devices often lose connectivity, roam between networks, can be difficult to locate, go to sleep to conserve power, or otherwise become unavailable. In addition, the use of multiple mobile devices often requires that the same sync data is pushed to a plurality of different mobile devices, thereby consuming network bandwidth and increasing the time required to sync the plurality of mobile devices.

SUMMARY OF THE INVENTION

In general, the present invention provides a method, system, and computer program product for prefetching sync data. In particular, in accordance with the present invention, a sync server periodically prefetches unprocessed sync data from a backend server and then processes, formats, and caches the sync data. Then, upon initiation of a sync process by a mobile device, the cached, preprocessed sync data is immediately available for download to the mobile device. This is in sharp contrast to currently available sync processes in which a mobile device, after initiating a sync, must wait for the sync data to be processed and formatted at a backend server, for the processed sync data to be transferred to a sync server, and for the sync data to be downloaded from the sync server to the mobile device.

The present invention also provides a method, system, and computer program product for edge caching the prefetched, preprocessed sync data on a personal cellular device (e.g., a cell phone). The cellular device receives the sync data from a sync server over a first data network (e.g., a cellular network) having a relatively slow data transfer rate, and caches the sync data. The cellular device is connected to at least one other mobile device via a second data network (e.g., a PAN) having a data transfer rate that is higher than the data transfer rate of the first data network. When a mobile device is powered on, and/or when an application on the mobile device requires access to the sync data, the sync data is immediately and rapidly transferred from the cellular device to the mobile device over the second data network. The sync data is then integrated with data already on the mobile device in a known manner.

A first aspect of the present invention is directed to a method for prefetching sync data, comprising: providing unprocessed sync data at a first location; downloading the unprocessed sync data from the first location to a second location over a first network; processing the unprocessed sync data at the second location to provide preprocessed sync data; storing the preprocessed sync data in a cache; receiving a sync request from a mobile device; and immediately providing at least a portion of the preprocessed sync data stored in the cache to the mobile device.

A second aspect of the present invention is directed to system for prefetching sync data, comprising: a system for downloading unprocessed sync data from a first location to a second location over a first network; a system for processing the unprocessed sync data at the second location to provide preprocessed sync data; a system for storing the preprocessed sync data in a cache; a system for receiving a sync request from a mobile device; and a system for immediately providing at least a portion of the preprocessed sync data stored in the cache to the mobile device.

A third aspect of the present invention is directed to a program product stored on a recordable medium for prefetching sync data, which when executed comprises: program code for providing unprocessed sync data at a first location; program code for downloading the unprocessed sync data from the first location to a second location over a first network; program code for processing the unprocessed sync data at the second location to provide preprocessed sync data; program code for storing the preprocessed sync data in a cache; program code for receiving a sync request from a mobile device; and program code for immediately providing at least a portion of the preprocessed sync data stored in the cache to the mobile device.

A fourth aspect of the present invention is directed to a method for deploying an application for prefetching sync data, comprising: providing a computer infrastructure being operable to: provide unprocessed sync data at a first location; download the unprocessed sync data from the first location to a second location over a first network; process the unprocessed sync data at the second location to provide preprocessed sync data; store the preprocessed sync data in a cache; receive a sync request from a mobile device; and immediately provide at least a portion of the preprocessed sync data stored in the cache to the mobile device.

A fifth aspect of the present invention is directed to computer software embodied in a propagated signal for prefetching sync data, the computer software comprising instructions to cause a computer system to perform the following functions: provide unprocessed sync data at a first location; download the unprocessed sync data from the first location to a second location over a first network; process the unprocessed sync data at the second location to provide preprocessed sync data; store the preprocessed sync data in a cache; receive a sync request from a mobile device; and immediately provide at least a portion of the preprocessed sync data stored in the cache to the mobile device.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for prefetching sync data. In particular, a sync server periodically prefetches unprocessed sync data from a backend server and then processes, formats, and caches the sync data. Then, upon initiation of a sync process by a mobile device, the cached, preprocessed sync data is immediately available for download to the mobile device. The present invention also provides a method, system, and computer program product for edge caching the prefetched, preprocessed sync data on a cellular device (e.g., a cell phone). (Edge caching refers to the caching of data at the edge of a network.) The cellular device receives the sync data (e.g., from a sync server) over a first data network (e.g., a cellular network) having a relatively slow data transfer rate, and caches the sync data. The cellular device is connected to at least one other mobile device via a second data network (e.g., a PAN) having a data transfer rate higher than the data transfer rate of the first data network. When a mobile device is powered on, and/or when an application on the mobile device requires access to the sync data, the sync data is immediately and rapidly transferred from the cellular device to the mobile device over the second data network. The sync data is then integrated with data already on the mobile device in a known manner.

Figure 1:
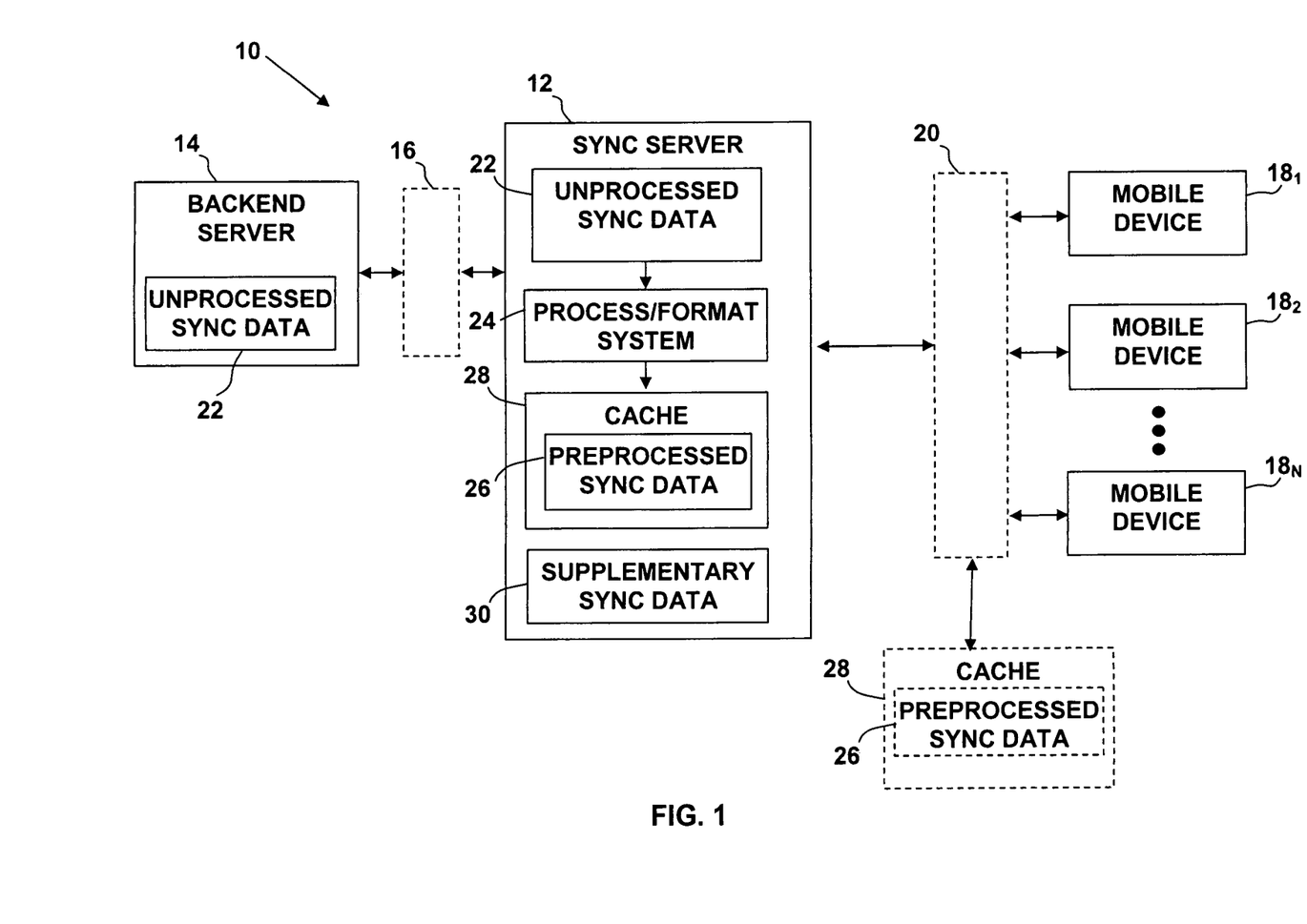
FIG. 1 depicts a system for prefetching sync data in accordance with an embodiment of the present invention.

A system 10 for prefetching sync data in accordance with an embodiment of the present invention is illustrated in FIG. 1. As shown, system 10 includes a sync server 12 that is connected to a backend server 14 via a first network 16. At least one mobile device 18 ($18_1$, $18_2$, ... $18_N$) is connected to the sync server 12 via a second network 20. Networks 16 and 20 can comprise the same or a different type of data network. Unprocessed sync data 22 destined for one or more of the mobile devices 18 is provided by the backend server 14 in a known manner. Rather than processing/formatting the unprocessed sync data 22 on the backend server 14 as is done in the prior art, the sync server 12 periodically queries the backend server 14, and if updated data is available for any of the mobile devices 18, prefetches the unprocessed sync data 22 from the backend server 14. After prefetching the unprocessed sync data 22, the sync server 12 processes/formats the unprocessed sync data in a known manner using processing system 24 to provide preprocessed sync data 26. The sync server 12 then caches the preprocessed sync data 26 in a cache 28. The cache 28 can be local to the sync server 12 and/or can be located remote from the sync server 12 (shown in phantom) and accessible through the second data network 20. For example, as will be described below with regard to another embodiment of the present invention, the cache 28 can be located within a cellular device such as a cell phone. The preprocessed sync data 26 in the cache 28, or a relevant portion thereof, is immediately available for transfer to each mobile device 18 in system 10 in response to corresponding sync requests.

In accordance with the present invention, unprocessed sync data 22 destined for multiple mobile devices 18 need only be downloaded once to the sync server 12 during each sync, where it is processed/formatted by processing system 24 and cached in cache 28. Once cached, the preprocessed sync data 26 is immediately available to all of the multiple mobile devices 18. Thus, multiple redundant downloads of the same sync data are avoided.

Figure 2:
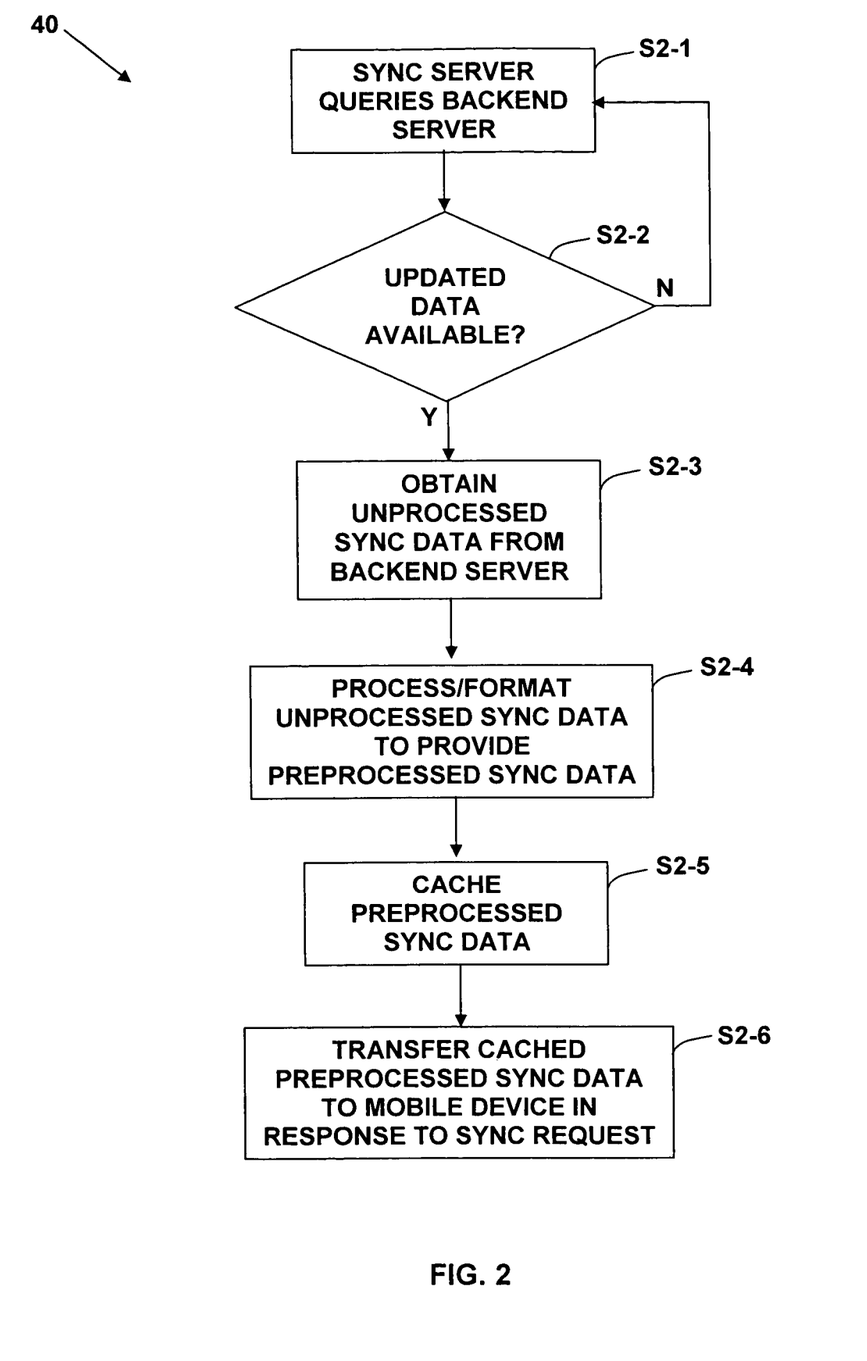
FIG. 2 depicts a flow diagram of a method for prefetching sync data in accordance with an embodiment of the present invention.

The above process is depicted in the flow diagram 40 illustrated in FIG. 2. In step S2-1, the sync server 12 periodically queries (e.g., every 15 minutes) the backend server 14 to determine whether updated data is available for any of the mobile device 18. If data has not been updated (step S2-2) since the last sync, the sync server 12 waits a predetermined period of time before again querying the backend server 14 for the presence of updated data. If data has been updated (step S2-2) since the last sync, then in step S2-3 the sync server 12 obtains the unprocessed sync data 22 from the backend server 14. The obtained unprocessed sync data 22 is then processed/formatted as necessary (step S2-4) by the processing system 24 of the sync server 12 to provide preprocessed sync data 26. In step S2-5, the sync server 12 caches the preprocessed sync data 26 in the cache 28. In step S2-6, the preprocessed sync data 26, or a relevant portion thereof, is immediately available for transfer to a mobile device 18 in response to a sync request. Thus, only a single server request/server response is required to immediately provide preprocessed sync data 26 to a mobile device 18 in response to a sync request.

Figure 3:
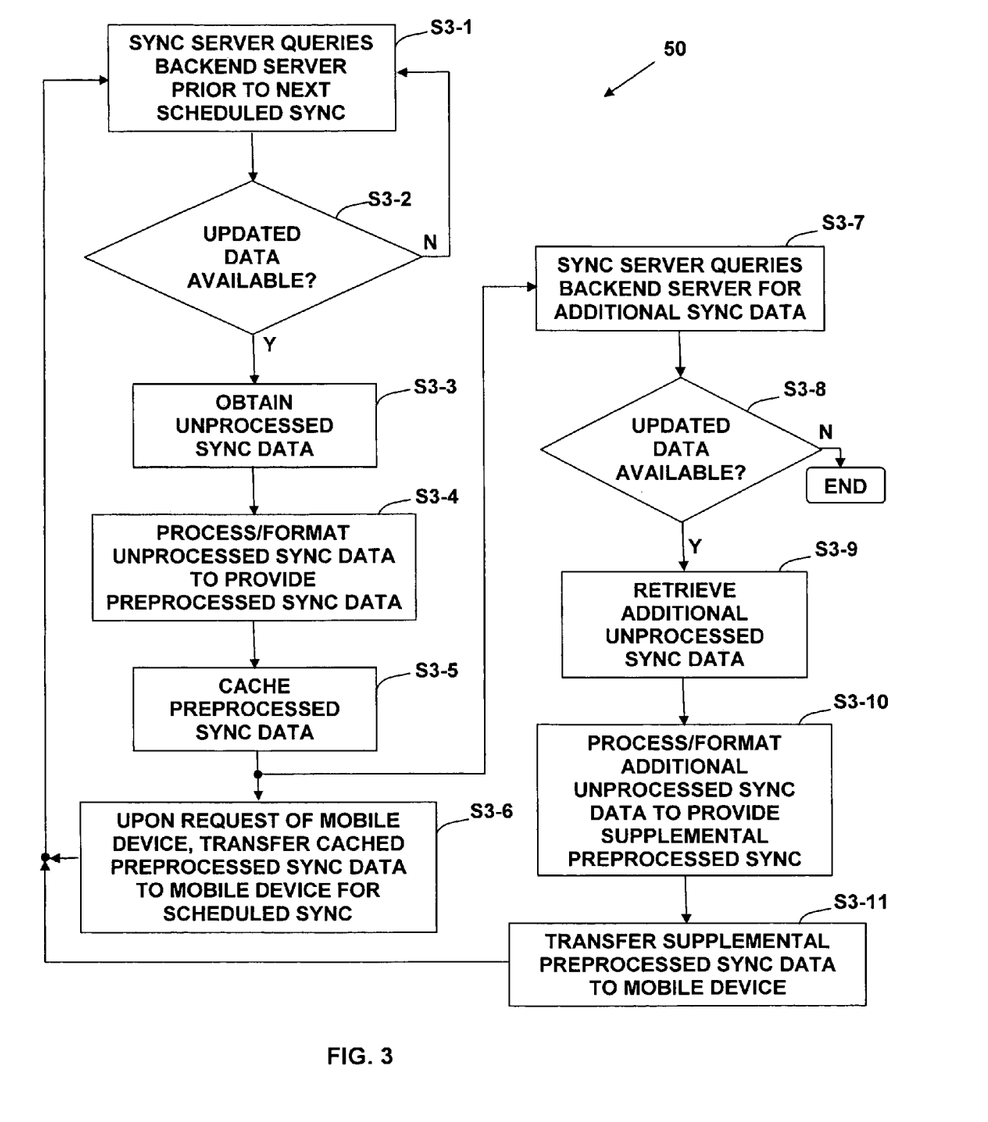
FIG. 3 depicts a flow diagram of a method for prefetching sync data for regularly scheduled syncs in accordance with an embodiment of the present invention.

In the case of regularly scheduled syncs, the sync server 12 queries the backend server 14 for unprocessed sync data 22 prior to the next scheduled sync. If unprocessed sync data 22 is available, the sync server 12 obtains the unprocessed sync data 22 from the backend server 14 and processes/formats the obtained unprocessed sync data 22 as necessary to provide preprocessed sync data 26. The sync server 12 subsequently caches the preprocessed sync data 26 in cache 28 such that it is available, upon request, to a mobile device 18 a short time before the next scheduled sync.

A flow diagram 50 depicting this process is illustrated in FIG. 3. In step S3-1, prior to a scheduled sync, the sync server 12 queries the backend server 14 to determine whether updated data is available for any of the mobile devices 18. If data has not been updated (step S3-2) since the last sync, the sync server 12 waits and repeats the query (step S3-1) prior to the next scheduled sync. If data has been updated (step S3-2) since the last sync, then in step S3-3 the sync server 12 obtains the unprocessed sync data 22 from the backend server 14. The obtained unprocessed sync data 22 is then processed/formatted as necessary (step S3-4) by the processing system 24 to provide preprocessed sync data 26. In step S3-5, the sync server 12 caches the preprocessed sync data 26 in the cache 28. In step S3-6, the preprocessed sync data 26 is immediately available for transfer, upon request, to a mobile device 18 for a scheduled sync. Flow then returns to step S3-1.

In some cases, data may be updated at the backend server 14 after preprocessed sync data 26 has been transferred to cache 28 by the sync server 12, but before a mobile device 18 performs a scheduled sync to download the preprocessed sync data 26 or a relevant portion thereof. In this case, the updated data will be available to the mobile device 18 during the next sync cycle. To avoid this situation, again referring to the flow diagram 50 illustrated in FIG. 3, the sync server 12 can query (step S3-7) the backend server 14 for any additional sync data in parallel to delivering (step S3-6) the preprocessed sync data 26 from the cache 28 to the mobile device 18. If additional unprocessed sync data 22 is available on the backend server 14 (step S3-8), it is retrieved (step S3-9) by the sync server 12 and processed/formatted (step S3-10) as necessary by the processing system 24 to provide supplemental sync data 30. This can occur in parallel with the delivery of the preprocessed sync data 26 from the cache 28 to the mobile device 18. The supplemental sync data 30 is then transferred (step S3-11) from the sync server 12 to the mobile device 18. This transfer can occur as soon as the supplemental sync data 30 is available from the sync server 12 (e.g., in parallel with the delivery of the preprocessed sync data 26 from the cache 28 to the mobile device 18) or immediately after the delivery of the preprocessed sync data 26. Preferably, the supplemental processed sync data 26 is provided to the mobile device before the next scheduled sync. After receipt, the mobile device 18 integrates the preprocessed sync data 26 and supplemental sync data 30 with the data already on the mobile device 18.

If a mobile device 18 is not configured for regularly timed syncs, has been turned off, has been out of network coverage, or has otherwise lost contact with the sync server 14, the mobile device 18 can still quickly download the preprocessed sync data 26 from the cache 28. In this case, the mobile device 18 initiates a sync and the preprocessed sync data 26 is immediately transferred from the cache 28 to the mobile device 18. Although this type of sync will likely involve more data than each of the periodic syncs described above, the time required to transfer the preprocessed sync data 26 to the mobile device 18 is still much less than that required by the sync processes of the prior art.

Figure 4:
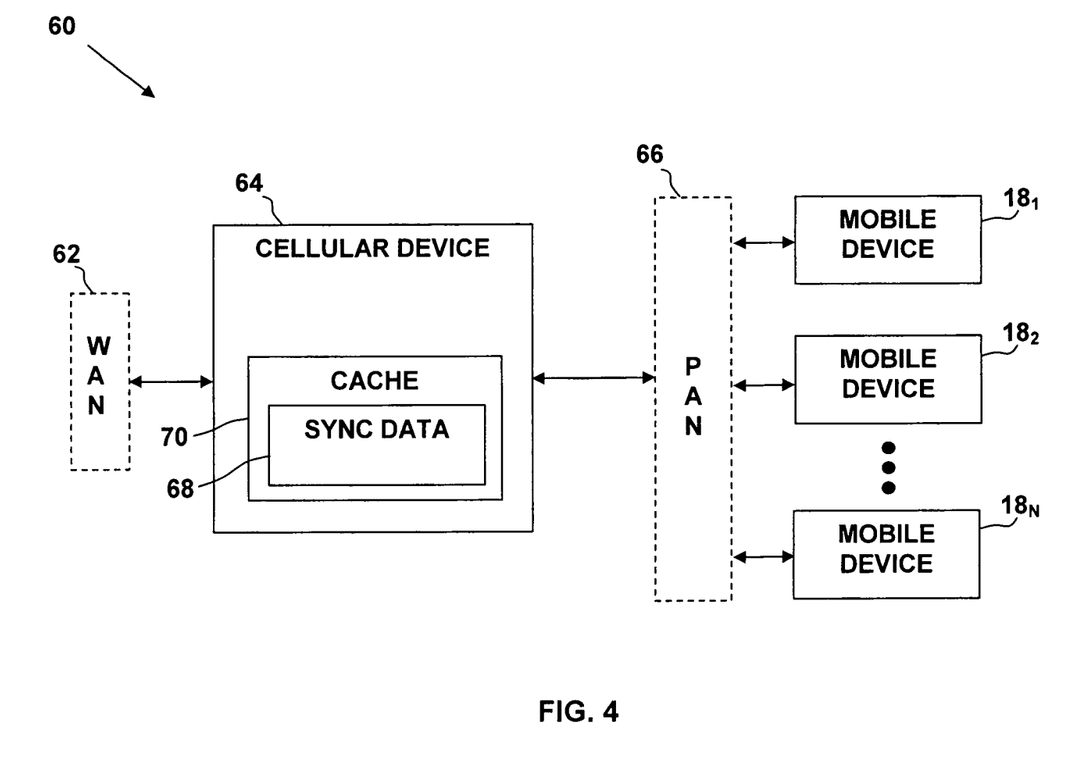
FIG. 4 depicts a system for edge caching sync data on a cellular device in accordance with an embodiment of the present invention.

A system 60 in accordance with another embodiment of the present invention is illustrated in FIG. 4. In system 60, at least one mobile device 18 ($18_1, 18_2, \ldots 18_N$) gains access to a wide area network (WAN) 62 by connecting to a personal cellular device 64 (e.g., a cell phone) using a personal area network (PAN) 66. As known in the art, a PAN is a wireless LAN with a very short range (up to approximately 10 meters). PANs are typically used to connect devices, such as a PDA, keyboard, mouse, printer, etc., to a user's computer. PANs enable easier interconnection between devices by eliminating cables. Bluetooth is a technology commonly used to form a PAN.

The WAN 62 comprises a cellular network typically having a relatively slow data transfer rate (e.g., 1.5 dial-up). Other WANs capable of transferring data to a cellular phone or other cellular device can also be used. To this extent, the cellular device 64 acts as the primary access point or gateway to the WAN 62 for each mobile device 18. Accordingly, only a single cellular account/number for the cellular device 64 is required to provide each mobile device 18 with access to the WAN 62. As described in greater detail below, those mobile devices 18 that would normally require their own cellular account/number to access WAN 62 to perform a sync can now immediately access the required sync data directly from the cellular device 64.

Sync data 68 for at least one of the mobile devices 18 is transferred to the cellular device 64 (e.g., from a sync server) over the WAN 62 and is stored in a cache 70 on the cellular device 64. The sync process can be initiated according to a predetermined schedule, in response to a user initiated sync, and/or in response to other predetermined criteria. The sync data 68 can be provided to the cellular device 64 using, for example, the method described above with regard to system 10. In this case, the sync data 68 would be preprocessed by a sync server and cached on the cellular device 64. Alternatively, the cellular device 64 itself could operate as the sync server. Other methods for caching the sync data 68 can also be used in the practice of the present invention. The cached sync data 68 is subsequently transferred over the PAN 66 and synced to a mobile device 18 in response to the powering on of the mobile device 18, the accessing of the relevant application/data on the mobile device 18, and/or in response to other predetermined initiating criteria. The PAN 66 typically has a much higher data transfer rate (e.g., 15× dial-up) than the WAN 62, thus allowing the sync data 68 to be quickly downloaded (e.g., in a few seconds) from the cache 70 of the cellular device 64 into each mobile device 18.

Because of the slow data transfer rate of the WAN 62, the sync data 68 essentially "trickles" down over a period of time into the cellular device 64 over the WAN 62. This occurs while the cellular device 64 is in cellular network coverage. However, this does not adversely affect the sync process because cellular device users typically keep their cellular devices continuously powered up, thereby providing sufficient time for the sync data 68 to be completely downloaded and stored in the cache 70 of the cellular device 64. The sync data 68 can be downloaded in the background, allowing normal use of the cellular device 64.

Each of the mobile devices 18 subscribes to the sync data 68. To this extent, the sync data 68 downloaded into the cache 70 of the cellular device 64 contains sync data (if available) for each mobile device 18 connected to the cellular device 64 over the PAN 66 (i.e., sync data for multiple mobile devices 18 can be provided in a single data transfer). When performing a sync, each mobile device 18 accesses/downloads the portion of the sync data 68 specifically directed to that mobile device 18. It should noted that a mobile device 18 may not necessarily retrieve all of its associated sync data 68 from the cache 70 on the cellular device 64 and may only retrieve a selected portion thereof. The sync data 68 retrieved by a given mobile device 18 may depend, for example, on the applications on the mobile device 18, the filter settings of the applications, and/or other factors. For example, an email program on a mobile device 18 may only be configured to sync messages marked as having a "high importance," or a calendaring program on a mobile device 18 may only be configured to sync calendar entries corresponding to meeting with a user's manager. Many other filtering possibilities also exist. Of course, sync data 68 filtering can also be provided on a mobile device 18 itself, although this may require the download of all of the sync data 68 associated with the mobile device 18 instead of a portion thereof.

After all of the mobile devices 18 have accessed the cellular device 64 over the PAN 66 to obtain sync data 68, the cellular device 64 deletes the sync data 68 from the cache 70. The sync process can then be repeated again according to a predetermined schedule, in response to a user initiated sync, and/or in response to other predetermined criteria.

Figure 5:
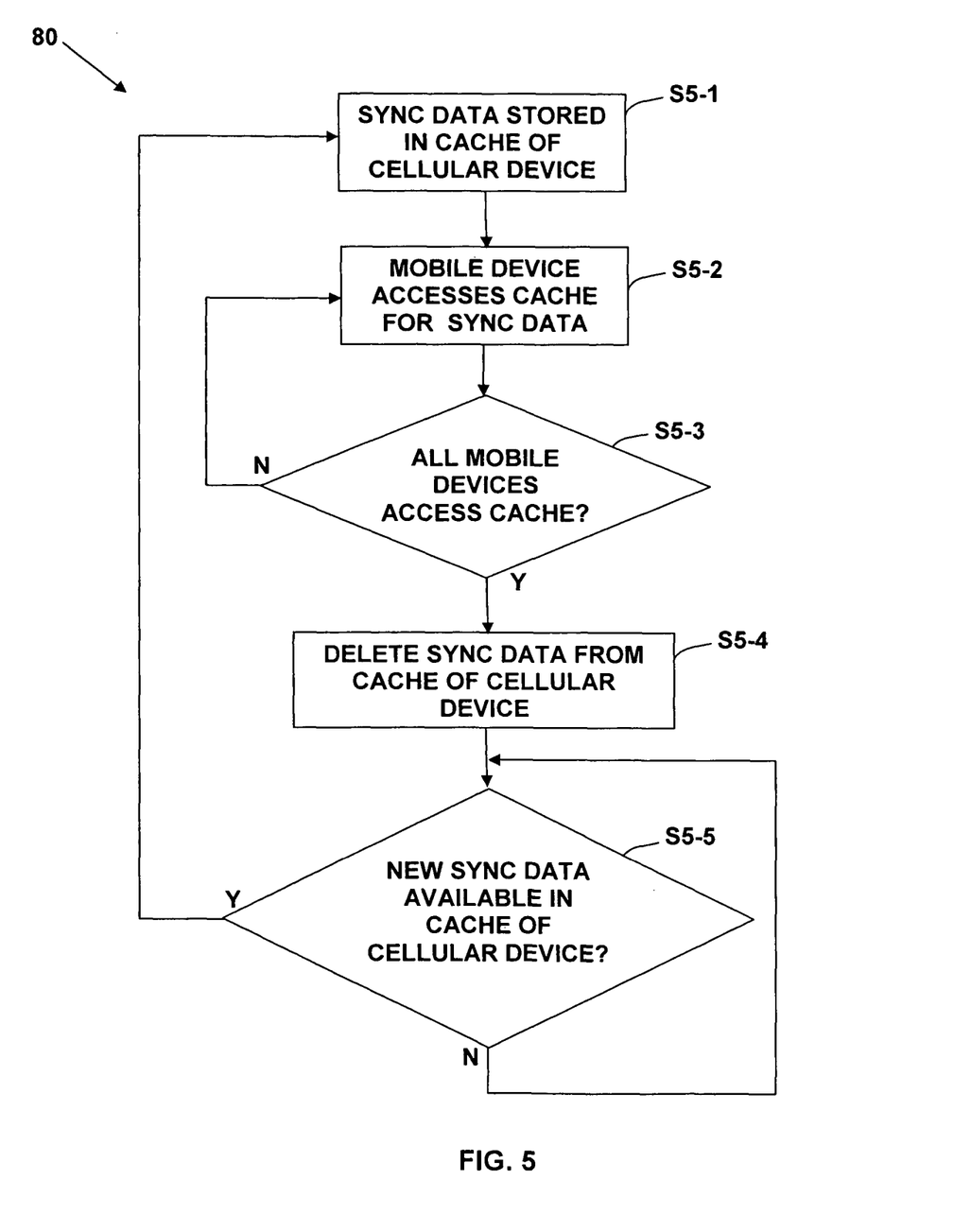
FIG. 5 depicts a flow diagram of a method for caching sync data on a cellular device in accordance with an embodiment of the present invention.

A flow diagram 80 illustrating the above-described process is illustrated in FIG. 5. In step S5-1, sync data 68, if any, for each mobile device 18 connected to the cellular device 64 over the PAN 66 is provided and stored in the cache 70 of the cellular device 64. At least one mobile device 18 then retrieves (step S5-2) at least a portion of the sync data 68 associated with that mobile device 18 from the cache 70. After all of the mobile devices 18 connected to the cellular device 64 over the PAN 66 have accessed the cache 70 to obtain sync data 68 (step S5-3), the sync data 68 in the cache 70 of the cellular device 64 is deleted (step S5-4). This process is repeated after new sync data 68 is available (step S5-5) in the cache 70 of the cellular device 64.

Figure 6:
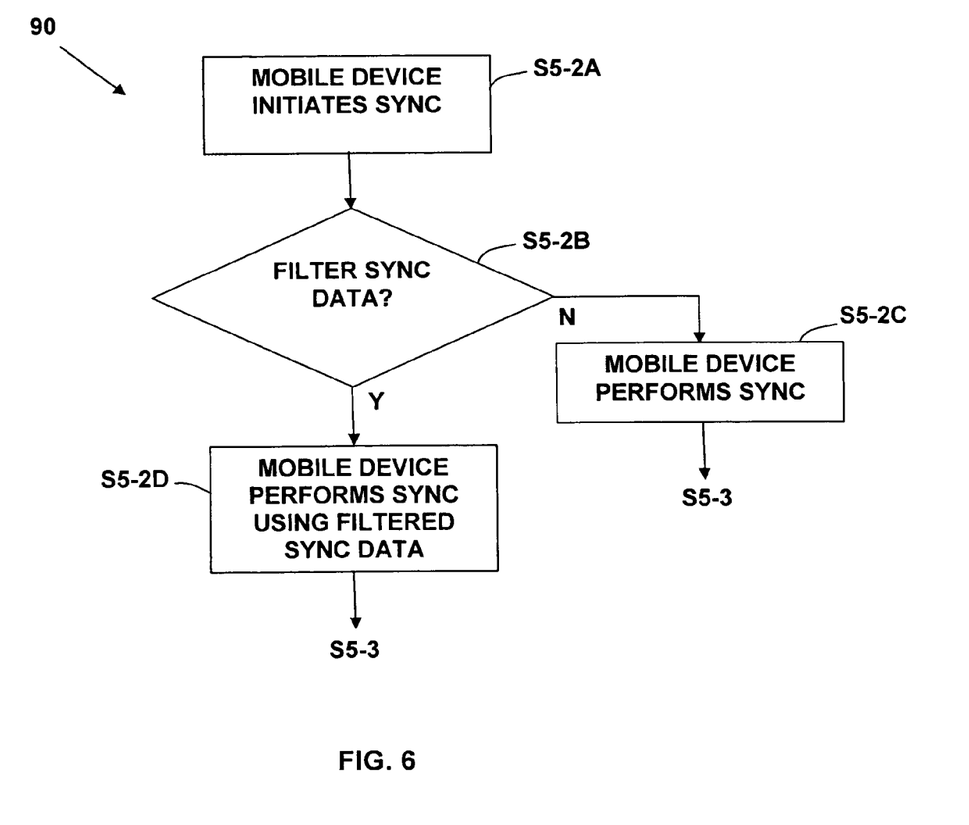
FIG. 6 depicts a flow diagram of a method for performing filtering of cached sync data on a cellular device in accordance with an embodiment of the present invention.

As described above, each mobile device 18 may only retrieve a portion of its associated sync data 68 from the cache 70 on the cellular device 64. Thus, step S5-2 in FIG. 5 can include additional sub-steps as depicted in the flow diagram 90 illustrated in FIG. 6. In step S5-2A, a mobile device 18 initiates a sync with the cellular device 64. If no sync data 68 filtering is required (step S5-2B), then the mobile device 18 performs a normal sync (step S5-2C) using all of its associated sync data 68 stored in the cache 70 on the cellular device 64. If filtering is required (step S5-2B), then only the sync data 68 in the cache 70 that meets the filtering criteria is downloaded to the mobile device 18. After receiving the filtered sync data 68, the mobile device 18 performs a sync (step S5-2D).

With the rapidly increasing capabilities of cellular devices (e.g., WAN and PAN networking, processing power, storage space, display capabilities, improved battery performance, etc.), a new model of handling remote data is now possible using the present invention. Instead of sync data simply passing through a cellular device 64 to the mobile devices 18, it is cached on the cellular device 64, where it can be accessed by the mobile devices 18. Only when a user decides to power on a laptop, handheld device, PDA, or other mobile device 18 connected to the cellular device 64 (or a sync is initiated in any other manner) does the second part of the sync operation take place in which at least a portion of the sync data 68 is transferred via the PAN 66 to each mobile device 18 where it is integrated with existing data.

By caching the sync data 68 on the cellular device 64, the cellular device 64 also has access to the sync data 68 destined for any of the mobile devices 18. For example, a user can view the sync data 68 or selected portions thereof locally on the cellular device 64, even if the user does not have access to a corresponding mobile device 18 (or just doesn't want to power the mobile device 18 up). The cellular device 64 can also be used to locally process alerts directed to one or more of the mobile devices 18. This can be a very useful tool since the cellular device 64 is typically the mobile device a user would most likely carry on his/her person. For example, if a user is expecting an important email from a particular person, the cellular device 64 can be configured to immediately alert the user when sync data 68 containing email from that person is received and cached on the cellular device 64. The alert may comprise the ringing or vibration of the cellular device 64, etc. The user can then immediately access and view information regarding the email in question directly on the cellular device 64 using the cached sync data. Such information may comprise the entire email, information regarding the sender of the email, the subject heading of the email, etc. Once alerted, the user can also turn on the mobile device 18 to which the email is directed, perform a sync, and then access and read the email. Many other alert scenarios are also possible.

Figure 7:
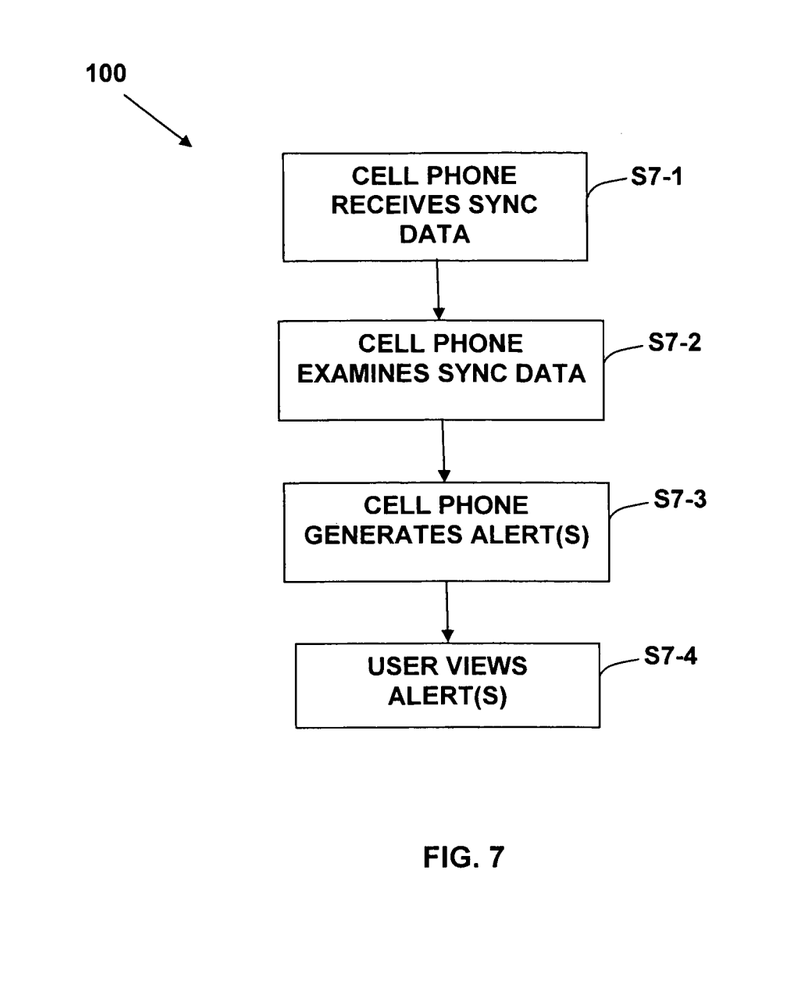
FIG. 7 depicts the use of alerts for sync data cached on a cellular device.

The use of alerts based on sync data 68 received by the cellular device 64 and stored in cache 70 is depicted in the flow diagram 100 illustrated in FIG. 7. In step S7-1, sync data 68 is received by the cellular device 64 over the WAN 62. In step S7-2, the cellular device 64 examines (e.g., filters) the sync data 68 for data meeting predetermined alert criteria. In step S7-3, the cellular device 64 generates at least one alert (ring, vibrate, etc.) to notify the user of the cellular device 64 of the receipt of important data. In step S7-4, the user views the alert(s). The user can then take whatever action the user deems necessary in response to the alert (e.g., view data on cellular device 64, power on corresponding mobile device(s), etc.).

Some laptops and other mobile devices include cellular modems. When such a mobile device 18 is powered off, the cellular modem can remain in a low power mode. Sync data 68 can be trickled to a cache 70 on the cellular modem, where it will be immediately available when the mobile device 18 is powered on.

It should be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

It should also be appreciated that the teachings of the present invention can be offered as a business method on a subscription or fee basis. For example, a computer system could be created, maintained, supported, and/or deployed by a service provider that offers the functions described herein for customers.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for prefetching sync data, comprising:
    downloading, to a cellular phone periodically querying a back-end server for unprocessed sync data, the unprocessed sync data destined for a plurality of mobile devices from the back-end server over a cellular network having a first data transfer rate;
    processing the unprocessed sync data at the cellular phone to provide preprocessed sync data;
    storing the preprocessed sync data in a cache in the cellular phone, wherein the cache stores the preprocessed sync data for the plurality of mobile devices;
    receiving a sync request from a requesting mobile device of the plurality of mobile devices;
    providing, in response to the received sync request, at least a portion of the preprocessed sync data stored in the cache to the requesting mobile device over a personal area network having a second data transfer rate higher than the first data transfer rate of the cellular network, wherein only a single sync request and a single corresponding response is required to provide the preprocessed sync data stored in the cache to the requesting mobile device; and
    erasing the preprocessed sync data from the cache only after all of the plurality of mobile devices have accessed the cache and downloaded at least a portion of the preprocessed sync data.

2. The method of claim 1, further comprising:
    querying the back-end server for unprocessed sync data prior to a next scheduled sync request from the requesting mobile device.

3. The method of claim 2, further comprising:
    providing at least a portion of the preprocessed sync data stored in the cache to the requesting mobile device in response to the next scheduled sync request.

4. The method of claim 3, further comprising:
    querying the back-end server for additional unprocessed sync data available after the storage of the preprocessed sync data in the cache but before the next scheduled sync request from the requesting mobile device.

5. The method of claim 4, further comprising:
    downloading the additional unprocessed sync data, if available, over the cellular network from the back-end server to the cellular phone;
    processing the additional unprocessed sync data at the cellular phone to provide supplemental preprocessed sync data; and
    transferring the supplemental preprocessed sync data to the requesting mobile device.

6. The method of claim 5, further comprising:
    transferring the supplemental preprocessed sync data to the requesting mobile device in parallel with, or after receipt of, the preprocessed sync data.

7. The method of claim 1, further comprising:
    filtering the preprocessed sync data according to at least one filtering criterion; and
    providing the filtered preprocessed sync data to the requesting mobile device.

8. The method of claim 1, further comprising:
    examining the preprocessed sync data according to an alert criterion; and
    alerting a user of the cellular phone that the alert criterion has been satisfied.

9. A system for prefetching sync data, the system comprising:
    a back-end server;
    a cellular phone; and
    a plurality of mobile devices;
    wherein the cellular phone is configured to:
    periodically query the back-end server for unprocessed sync data, the unprocessed sync data destined for the plurality of mobile devices;
    download the unprocessed sync data from the back-end server over a cellular network having a first data transfer rate;
    process the unprocessed sync data at the cellular phone to provide preprocessed sync data;
    store the preprocessed sync data in a cache in the cellular phone, wherein the cache stores the preprocessed sync data for the plurality of mobile devices;
    receive a sync request from a requesting mobile device of the plurality of mobile devices;
    provide, in response to the received sync request, at least a portion of the preprocessed sync data stored in the cache to the requesting mobile device over a personal area network having a second data transfer rate higher than the first data transfer rate of the cellular network, wherein only a single sync request and a single corresponding response is required to provide the preprocessed sync data stored in the cache to the requesting mobile device; and erase the preprocessed sync data from the cache only after all of the plurality of mobile devices have accessed the cache and downloaded at least a portion of the preprocessed sync data.

10. The system of claim 9, the system further comprising: the cellular phone configured to:

query the back-end server for unprocessed sync data prior to a next scheduled sync request from the requesting mobile device.

11. The system of claim 10, the system further comprising: the cellular phone configured to:

provide at least a portion of the preprocessed sync data stored in the cache to the requesting mobile device in response to the next scheduled sync request.

12. The system of claim 11, the system further comprising: the cellular phone configured to:

query the back-end server for additional unprocessed sync data available after the storage of the preprocessed sync data in the cache but before the next scheduled sync request from the requesting mobile device.

13. The system of claim 12, the system further comprising: the cellular phone configured to:

download the additional unprocessed sync data, if available, over the cellular network from the back-end server;

process the additional unprocessed sync data to provide supplemental preprocessed sync data; and transfer the supplemental preprocessed sync data to the requesting mobile device.

14. The system of claim 13, the system further comprising: the cellular phone configured to:

transfer the supplemental preprocessed sync data to the requesting mobile device in parallel with, or after receipt of, the preprocessed sync data.

15. The system of claim 9, the system further comprising: the cellular phone configured to:

filter the preprocessed sync data according to at least one filtering criterion; and provide the filtered preprocessed sync data to the requesting mobile device.

16. The system of claim 9, further comprising:

the cellular phone configured to:

examine the preprocessed sync data according to an alert criterion; and alert a user of the cellular phone that the alert criterion has been satisfied.

17. A program product stored on a non-transitory computer recordable medium, which when executed by a computer prefetches sync data, the program product comprising program code for:

downloading, to a cellular phone periodically querying a back-end server for unprocessed sync data, the unprocessed sync data destined for a plurality of mobile devices from the back-end server over a cellular network having a first data transfer rate;

processing the unprocessed sync data at the cellular phone to provide preprocessed sync data;

storing the preprocessed sync data in a cache in the cellular phone, wherein the cache stores the preprocessed sync data for the plurality of mobile devices;

receiving a sync request from a requesting mobile device of the plurality of mobile devices;

providing, in response to the received sync request, at least a portion of the preprocessed sync data stored in the cache to the requesting mobile device over a personal area network having a second data transfer rate higher than the first data transfer rate of the cellular network, wherein only a single sync request and a single corresponding response is required to provide the preprocessed sync data stored in the cache to the requesting mobile device; and erasing the preprocessed sync data from the cache only after all of the plurality of mobile devices have accessed the cache and downloaded at least a portion of the preprocessed sync data.

18. The program product of claim 17, further comprising program code for:

querying the back-end server for unprocessed sync data prior to a next scheduled sync request from the requesting mobile device.

19. The program product of claim 18, further comprising program code for:

providing at least a portion of the preprocessed sync data stored in the cache to the requesting mobile device in response to the next scheduled sync request.

20. The program product of claim 19, further comprising program code for:

querying the back-end server for additional unprocessed sync data available after the storage of the preprocessed sync data in the cache but before the next scheduled sync request from the requesting mobile device.

21. The program product of claim 20, further comprising program code for:

downloading the additional unprocessed sync data, if available, over the cellular network from the back-end server to the cellular phone;

processing the additional unprocessed sync data at the cellular phone to provide supplemental preprocessed sync data; and transferring the supplemental preprocessed sync data to the requesting mobile device.

22. The program product of claim 21, further comprising program code for:

transferring the supplemental preprocessed sync data to the requesting mobile device in parallel with, or after receipt of, the preprocessed sync data.

23. The program product of claim 17, further comprising program code for:

filtering the preprocessed sync data according to at least one filtering criterion; and providing the filtered preprocessed sync data to the requesting mobile device.

24. The program product of claim 17, further comprising program code for:

examining the preprocessed sync data according to an alert criterion; and alerting a user of the cellular phone that the alert criterion has been satisfied.

* * * * *